3,496,152
SYNERGISTIC ACCELERATOR COMBINATIONS OF PHOSPHORODITHIOATES AND THIURAMS OR DITHIOCARBONATES FOR EPDM RUBBERS
Eiichi Morita, Albans, W. Va., and Aubert Yaucher Coran, Creve Coeur, Mo., assignors to Monsanto Company, St. Louis, Mo., a corporation of Delaware
No Drawing. Filed Mar. 6, 1967, Ser. No. 620,598
Int. Cl. C08f 27/07, 45/72
U.S. Cl. 260—79.5
13 Claims

ABSTRACT OF THE DISCLOSURE

Synergism is shown in the cure-rate factors for EPDM rubber when vulcanization accelerator combinations of this invention are used. The combinations consist of a salt of a phosphorodithioic acid combined with either a thiuram accelerator or a salt of a dithiocarbamic acid accelerator.

Background of the invention

The invention pertains to the field of accelerators for the vulcanization of EPDM rubber. The U.S. patent classification is Class 260, Subclass 079.5.

Romieux and Christmann in U.S. Patent 1,867,631 assigned to the American Cyanamid Company (1932) teach the accelerator properties of di-substituted phosphorodithioates for the vulcanization of rubber. This work is followed by Anderson's in U.S. Patent 2,879,243 assigned to the United States Rubber Company (1959) which reports thiazole accelerators activated by alkali dialkyl phosphorodithioates as accelerator combinations for the vulcanization of rubber articles formed from latex. The thiurams are known vulcanization accelerators, for example, tetramethylthiuram disulfide is a commercial accelerator trademarked "Thiurad." The salts of dithiocarbamic acids are known accelerators, for example, zinc dimethyl dithiocarbamate is a commercial accelerator trademarked "Methazate."

Summary of the invention

Synergism is shown in the cure-rate factors for EPDM rubber when vulcanization accelerator combinations of this invention are used. The combinations consist of a salt of a phosphorodithioic acid combined with either a thiuram accelerator or a salt of a dithiocarbamic acid accelerator. A fast-curing accelerator system is desirable for EPDM rubber. Shortened times for the cure-rate factors are shown in EPDM rubber stocks which contain the accelerator combinations of this invention in comparison to stocks which contain the accelerators as single elements. The accelerator combinations of this invention provide improved curing systems for EPDM rubber which are faster curing than the accelerators when used as single elements in EPDM. The salts of phosphorodithioic acids useful in this invention are compounds of either Formula A

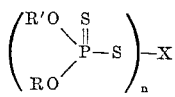

or

Formula B

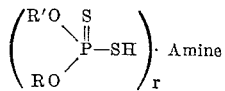

The R and R' in both formulas are straight or branched alkyl, aryl, alicyclic, alkenyl, aralkyl, or alkaryl radicals of less than 19 carbon atoms. R and R' can be the same or different radicals. In Formula A, $n$ is 2 when X is zinc, iron, cadmium, tin, or copper. In Formula A, $n$ is 3 when X is iron. In Formula A, $n$ is 4 when X is tellurium or tin. In Formula B the amine can be a primary, secondary, or tertiary amine. In Formula B, $r$ is 1 when the amine is diethylamine, cyclohexylamine, tert-butylamine, monoethanolamine, diethanolamine, triethanolamine, diisopropanolamine, triisopropanolamine, morpholine, piperidine, or 3-azobicyclo[3.2.2]nonane. In Formula B, $r$ is 2 when the amine is piperazine. Some examples of the salts of phosphorodithioic acids useful in this invention are as follows:

S-zinc O,O-dibutyl phosphorodithioate
S-zinc O,O-diisopropyl phosphorodithioate
S-zinc O,O-dipropyl phosphorodithioate
S-zinc O,O-diethyl phosphorodithioate
S-zinc O,O-dimethyl phosphorodithioate
S-zinc O,O-bis(1,3-dimethylbutyl)phosphorodithioate
S-zinc O,O-bis(2-ethylhexyl)phosphorodithioate
S-zinc O,O-bis(4-methylpentyl)phosphorodithioate
S-zinc O,O-ditridecyl phosphorodithioate
S-zinc O,O-diamyl phosphorodithioate
S-zinc O,O-dihexyl phosphorodithioate
S-zinc O,O-dilauryl phosphorodithioate
S-zinc O,O-dioctadecyl phosphorodithioate
S-zinc O,O-dioctyl phosphorodithioate
S-tellurium O,O-di-n-butyl phosphorodithioate
S-tellurium O,O-diisopropyl phosphorodithioate
S-tellurium O,O-dipropyl phosphorodithioate
S-tellurium O,O-diethyl phosphorodithioate
S-tellurium O,O-dimethyl phosphorodithioate
S-tellurium O,O-bis(1,3-dimethylbutyl)phosphorodithioate
S-tellurim O,O-bis(2-ethylhexyl)phosphorodithioate
S-tellurium O,O-bis(4-methylpentyl)phosphorodithioate
S-tellurium O,O-ditridecyl phosphorodithioate
S-tellurium O,O-diamyl phosphorodithioate
S-tellurim O,O-dihexyl phosphorodithioate
S-tellurium O,O-dilauryl phosphorodithioate
S-tellurium O,O-dioctadecyl phosphorodithioate
S-tellurium O,O-dioctyl phosphorodithioate
S-iron O,O-dibutyl phosphorodithioate
S-iron O,O-diisopropyl phosphorodithioate
S-iron O,O-dipropyl phosphorodithioate
S-iron O,O-diethyl phosphorodithioate
S-iron O,O-dimethyl phosphorodithioate
S-iron O,O-bis(1,3-dimethylbutyl)phosphorodithioate
S-iron O,O-bis (2-ethylhexyl)phosphorodithioate
S-iron O,O-bis (4-methylpentyl)phosphorodithioate
S-iron O,O-ditridecyl phosphorodithioate
S-iron O,O-diamyl phosphorodithioate
S-iron O,O-dihexyl phosphorodithioate
S-iron O,O-dilauryl phosphorodithioate
S-iron O,O-dioctadecyl phosphorodithioate
S-iron O,O-dioctyl phosphorodithioate
S-cadmium O,O,-dibutyl phosphorodithioate
S-cadmium O,O-diisopropyl phosphorodithioate
S-cadmium O,O-dipropyl phosphorodithioate
S-cadmium O,O-diethyl phosphorodithioate
S-cadmium O,O-dimethyl phosphorodithioate
S-cadmium O,O - bis(1,3-dimethylbutyl)phosphorodithioate
S-cadmium O,O-bis(2-ethylhexyl)phosphorodithioate
S-cadmium O,O-bis(4-methylpentyl)phosphorodithioate
S-cadmium O,O,-ditridecyl phosphorodithioate
S-cadmium O,O-diamyl phosphorodithioate
S-cadmium O,O-dihexyl phosphorodithioate
s-cadmium O,O-dilauryl phosphorodithioate
S-cadmium O,O-dioctadecyl phosphorodithioate
S-cadmium O,O-dioctyl phosphorodithioate S-tin O,O-dibutyl phosphorodithioate
S-tin O,O-diisopropyl phosphorodithioate
S-tin O,O-dipropyl phosphorodithioate
S-tin O,O-diethyl phosphorodithioate
S-tin O,O-dimethyl phosphorodithioate
S-tin O,O-bis(1,3-dimethylbutyl)phosphorodithioate
S-tin O,O-bis(2-ethylhexyl)phosphorodithioate
S-tin O,O-bis(4-methylpentyl)phosphorodithioate
S-tin O,O-ditridecyl phosphorodithioate
S-tin O,O-diamyl phosphorodithioate
S-tin O,O-dihexyl phosphorodithioate
S-tin O,O-dilauryl phosphorodithioate
S-tin O,O-dioctadecyl phosphorodithioate
S-tin O,O-dioctyl phosphorodithioate
S-copper O,O-dibutyl phosphorodithioate
S-copper O,O-diisopropyl phosphorodithioate
S-copper O,O-dipropyl phosphorodithioate
S-copper O,O-diethyl phosphorodithioate
S-copper O,O-dimethyl phosphorodithioate
S-copper O,O-bis(1,3-dimethylbutyl)phosphorodithioate
S-copper O,O-bis(2-ethylhexyl)phosphorodithioate
S-copper O,O-bis(4-methylpentyl)phosphorodithioate
S-copper O,O-ditridecyl phosphorodithioate
S-copper O,O-diamyl phosphorodithioate
S-copper O,O-dihexyl phosphorodithioate
S-copper O,O-dilauryl phosphorodithioate
S-copper O,O-dioctadecyl phosphorodithioate
S-copper O,O-dioctyl phosphorodithioate
Tert-butylamine salt of O,O-di-n-butyl phosphorodithioic acid
Diethylamine salt of O,O-di-n-butyl phosphorodithioic acid
Cyclohexylamine salt of O,O-di-n-butyl phosphorodithioic acid
Morpholine salt of O,O-di-n-butyl phosphorodithioic acid
Monoethanolamine salt of O,O-di-n-butyl phosphorodithioic acid
Diethanolamine salt of O,O-di-n-butyl phosphorodithioic acid
Triethanolamine salt of O,O-di-n-butyl phosphorodithioic acid
Diisopropanolamine salt of O,O-di-n-butyl phosphorodithioic acid
Triisopropanolamine salt of O,O-di-n-butyl phosphorodithioic acid
Piperazine salt of O,O-di-n-butyl phosphorodithioic acid
Piperidine salt of O,O-di-n-butyl phosphorodithioic acid
3-azabicyclo[3.2.2]nonane salt of O,O-di-n-butyl phosphorodithioic acid The thiuram useful in this invention is a compound of the formula

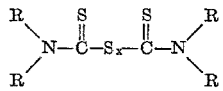

The R's are alkyl or alicyclic radicals containing 1 to 9 carbon atoms. The R's on the same nitrogen can form a ring with the nitrogen atom, and the ring contains from 4 to 9 carbon atoms. In addition, the R's on the same nitrogen can form a ring with the nitrogen of morpholine or 2,6-dimethyl morpholine. The $x$ can be a number from 1 to 4. Some examples of the thiurams useful in this invention are as follows:

Tetramethylthiuram monosulfied
Tetramethylthiuram disulfide
Tetramethylthiuram trisulfide
Tetramethylthiuram tetrasulfide
Tetraethylthiuram monosulfide
Tetraethylthiuram disulfide
Tetraethylthiuram trisulfide
Tetraethylthiuram tetrasulfide
Tetrapropylthiuram monosulfide
Tetrapropylthiuram disulfide
Tetrapropylthiuram trisulfide
Tetrapropylthiuram tetrasulfide
Tetraisopropylthiuram monosulfide
Tetraisopropylthiuram disulfide
Tetraisopropylthiuram trisulfide
Tetraisopropylthiuram tetrasulfide
Tetrabutylthiuram monosulfide
Tetrabutylthiuram disulfide
Tetrabutylthiuram trisulfide
Tetrabutylthiuram tetrasulfide The salts of dithiocarbamic acid are a well-known class of accelerators. Some examples of these compounds useful in this invention are as follows:

Zinc dimethyl dithiocarbamate
Zinc diethyl dithiocarbamate
Zinc dibutyl dithiocarbamate
Cadmium diethyl dithiocarbamate
Selenium diethyl dithiocarbamate
Tellurium diethyl dithiocarbamate
Piperidinium pentamethylene dithiocarbamate
N,N-dimethylcyclohexylamine salt of dibutyl dithiocarbamic acid The invention is useful in EPDM rubber. The American Society for Testing Materials (ASTM) defines EPDM in the 1965 Book of ASTM Standards, Part 28, page 695, as follows: "EPDM-Terpolymer containing ethylene and propylene in the backbone and a diene in the side chain." Amberg discusses the dienes which have been used with ethylene and propylene in Vulcanization of Elastomers 324, 325 (Alliger and Sjothum ed. 1963). Amberg states: "Good results have been obtained with compounds which have one internal and one terminal double bond. Dicyclopentadiene is one of the preferred dienes. 2-methylene-norbornene and 11-ethyl-1,11-tridecadiene are examples of other monomers which react satisfactorily." Cyclooctadiene and 1,4-hexadiene are also used as the diene monomer of EPDM.

Preferred embodiments

The curing characteristics in the tables, below, are obtained by testing EPDM with various accelerators and accelerator combinations in a Mooney Viscometer and a Monsanto Oscillating Disk Rheometer.

The Mooney Viscometer tests are run at 135° C. The Mooney Viscometer is a curemeter with a rotating disk embedded in a rubber sample. The $t_5$ is the time in minutes required for the Mooney reading to rise 5 points above the minimum viscosity of the rubber sample. The $t_5$ indicates scorch time for the EPDM sample. Scorch time is the time required for incipient vulcanization of a rubber sample. The $t_{35}-t_5$ is a cure-rate factor and is the time required for an increase of 30 Mooney units above $t_5$. The Mooney Viscometer method of determining curing characteristics has the American Society for Testing Materials (ASTM) Designation D–1646–63.

The Rheometer is a curemeter with an oscillating disk embedded in a rubber sample. The $t_2$ is the time in minutes for a rise of two rheometer units above the minimum reading. The $t_2$ indicates scorch time for the EPDM sample. The $t_{60}$ is the time required to obtain a torque 60% of the maximum. $R_{max.}$ is the maximum torque and $R_{min.}$ is the minimum torque. The Monsanto Oscillating Disk Rheometer is described by Decker, Wise, and Guerry, Rubber World, December 1962, page 68.

The stress-strain data in the tables, showing moduli at 300% elongation, ultimate tensile strength, and elongation are obtained using the method of the ASTM Designation, D–412–64T. The method covers the determination of the effect of the application of a tension load to a vulcanized sample of EPDM containing an accelerator or accelerator combination of this invention. The modulus at 300% elongation is calculated as follows:

$$\text{Modulus at 300\% elongation in lbs./in.}^2 = \frac{\text{Force at 300\%}}{\text{Original cross-sectional area of the sample}}$$

The data in Table I show curing characteristics of EPDM containing the accelerators tetramethylthiuram disulfide, zinc dimethyl dithiocarbamate and S-zinc O,O-di-n-butyl phosphorodithioate. The data in Table I illustrate the enhanced effectiveness of each accelerator when combinations of accelerator containing S-zinc O,O-di-n-butyl phosphorodithioate are used. The EPDM used in the tests reported in Tables I, II, and III is trademarked "Royalene 301" by the United States Rubber Company. The EPDM is compounded into the following masterbatch:

Masterbatch ingredients: Parts by weight
EPDM _____ 100
Carbon black _____ 200
Oil softener _____ 100
Zinc oxide _____ 5
Stearic acid _____ 1
Sulfur _____ 2

The compounded rubber samples of Table I contain the following curing systems of accelerators or accelerator combinations:

| Stock | Curing System | Parts by Weight |
|---|---|---|
| 1 | Tetramethylthiuram disulfide | 3 |
| 2 | Tetramethylthiuram disulfide | 2.5 |
|   | S-zinc O,O-di-n-butyl phosphorodithioate | 0.5 |
| 3 | Tetramethylthiuram disulfide | 2 |
|   | S-zinc O,O-di-n-butyl phosphorodithioate | 1 |
| 4 | Tetramethylthiuram disulfide | 1 |
|   | S-zinc O,O-di-n-butyl phosphorodithioate | 2 |
| 5 | S-zinc O,O-di-n-butyl phosphorodithioate | 3 |
| 6 | S-zinc O,O-di-n-butyl phosphorodithioate | 1.5 |
|   | Zinc dimethyl dithiocarbamate | 1.5 |
| 7 | Zinc dimethyl dithiocarbamate | 3 |

The compounded EPDM rubber samples of Table II contain the following curing systems of accelerators or accelerator combinations:

| Stock | Curing System | Parts by Weight |
|---|---|---|
| 1 | Tetramethylthiuram monosulfide | 3 |
| 2 | Tetramethylthiuram monosulfide | 2.5 |
|   | S-tellurium O,O-di-n-butyl phosphorodithioate | 0.5 |
| 3 | Tetramethylthiuram monosulfide | 2 |
|   | S-tellurium O,O-di-n-butyl phosphorodithioate | 1 |
| 4 | Tetramethylthiuram monosulfide | 1 |
|   | S-tellurium O,O-di-n-butyl phosphorodithioate | 2 |
| 5 | S-tellurium O,O-di-n-butyl phosphorodithioate | 3 |

TABLE II

| Minutes Cure at 160° C. | Stock | | | | |
|---|---|---|---|---|---|
| | 1 | 2 | 3 | 4 | 5 |
| Mooney Scorch at 135° C.: | | | | | |
| $t_5$ | 30.3 | 27.3 | 25.9 | 22.7 | 22.8 |
| $t_{35}-t_5$ | 14.5 | 10.4 | 8.5 | 9.6 | 18.0 |
| Rheometer at 160° C.: | | | | | |
| $R_{max}$ | 43.8 | 44.1 | 42.5 | 38.9 | 37.1 |
| $R_{min}$ | 3.1 | 3.2 | 3.1 | 3.1 | 3.0 |
| $t_2$ | 10.3 | 9.2 | 8.8 | 7.8 | 6.7 |
| $t_{60}$ | 18.5 | 18.1 | 18.7 | 19.5 | 24.1 |
| Stress-Strain: | | | | | |
| Modulus at 300% Elongation | | | | | |
| 35 | | | 1,200 | | |
| 40 | | | | 1,180 | 1,120 |
| 50 | | | | | 1,150 |
| Ultimate Tensile Strength | | | | | |
| 35 | 1,280 | 1,250 | 1,250 | | |
| 40 | | | | 1,240 | 1,140 |
| 50 | 1,340 | 1,350 | 1,340 | 1,300 | 1,270 |
| Elongation | | | | | |
| 35 | 290 | 280 | 330 | | |
| 40 | | | | 320 | 300 |
| 50 | 290 | 280 | 280 | 290 | 340 |

The cure-rate factors ($t_{35}-t_5$) of stocks 2, 3, and 4 of Table II illustrate the enhanced effectiveness of accelerator combinations of this invention containing S-tellurium O,O-di-n-butyl phosphorodithioate. Each stock containing an accelerator combination shows a faster cure-rate fac-

TABLE I

| Minutes Cure at 160° C. | Stock | | | | | | |
|---|---|---|---|---|---|---|---|
| | 1 | 2 | 3 | 4 | 5 | 6 | 7 |
| Mooney Scorch at 135° C.: | | | | | | | |
| $t_5$ | 18.8 | 16.0 | 15.7 | 12.7 | 12.9 | 6.7 | 11.1 |
| $t_{35}-t_5$ | 13.1 | 9.5 | 8.0 | 11.2 | 33.5 | 15.1 | 34.6 |
| Rheometer at 160° C.: | | | | | | | |
| RPP | 57.1 | 53.3 | 51.3 | 44.7 | 35.7 | 40.6 | 43.2 |
| R | 3.2 | 3.0 | 3.0 | 3.0 | 3.0 | 3.3 | 3.3 |
| $t_2$ | 6.3 | 5.9 | 5.5 | 4.7 | 6.2 | 3.8 | 5.3 |
| $t_{60}$ | 16.0 | 15.5 | 15.7 | 16.8 | 22.0 | 16.3 | 16.9 |
| Stress Strain: | | | | | | | |
| Modulus at 300% Elongation | | | | | | | |
| 35 | | | | | | 1,150 | 1,190 |
| 40 | | | | 1,250 | | | |
| 50 | | | | 1,230 | 990 | 1,200 | |
| 60 | | | | | 1,110 | | |
| Ultimate Tensile Strength | | | | | | | |
| 35 | 1,290 | 1,300 | 1,280 | | | 1,180 | 1,260 |
| 40 | | | | 1,300 | | | |
| 50 | 1,240 | 1,380 | 1,340 | 1,290 | 1,150 | 1,200 | 1,300 |
| 60 | | | | | 1,200 | | |
| Elongation | | | | | | | |
| 35 | 250 | 270 | 290 | | | 330 | 320 |
| 45 | | | | 350 | | | |
| 50 | 210 | 280 | 280 | 300 | 280 | 300 | 280 |
| 60 | | | | | 350 | | |

The cure-rate factors ($t_{35}-t_5$) of stocks 2, 3, 4, and 6 of Table I illustrate the enhanced effectiveness of the accelerator combinations of this invention. Each stock containing an accelerator combination shows a faster cure rate than stocks containing only single elements of the combinations (stocks 1, 5, and 7). The scorch time ($t_5$) shown in the Mooney data shows a reduction in time for incipient vulcanization for stocks 2, 3, 4, and 6 over the single element curing systems of stocks 1, 5, and 7. The time for incipient vulcanization ($t_2$) in the rheometer data is reduced in stocks 2, 3, 4, and 6 over the single element curing systems.

tor than stocks containing only single elements of the combination. Results comparable to those in Tables I and II are obtained with accelerator combinations which include S-iron O,O-di-n-butyl phosphorodithioate, S-cadmium O,O-di-n-butyl phosphorodithioate, S-tin O,O-di-n-butyl phosphorodithioate, S-copper O,O-di-n-butyl phosphorodithioate or other metal salts of this invention.

The data in Table III show curing characteristics of EPDM containing an accelerator combination of this invention which includes the element tert-butylamine salt of O,O-di-n-butyl phosphorodithioic acid. The compounded EPDM rubber samples of Table III contain the fol-

| Stock | Curing System | Parts by Weight |
|---|---|---|
| 1 | Tetramethylthiuram monosulfide | 3 |
| 2 | Tetramethylthiuram monosulfide | 2 |
|   | Tert-butylamine salt of O,O-di-n-butyl phosphorodithioic acid | 1 |
| 3 | Tert-butylamine salt of O,O-di-n-butyl phosphorodithioic acid | 3 |

TABLE III

| Stock | 1 | 2 | 3 |
|---|---|---|---|
| Mooney Scorch at 135° C.: | | | |
| $t_5$ | 29.0 | 29.8 | 19.5 |
| $t_{35}-t_5$ | 21.5 | 10.9 | (*) |
| Rheometer at 160° C.: | | | |
| $R_{max}$ | 43.0 | 40.0 | 28.2 |
| $t_2$ | 12.5 | 10.0 | 10.8 |
| $t_{60}$ | 22.2 | 21.8 | 39.3 |

* The Mooney Scorch test was stopped before a $t_{35}$ Mooney unit rise because the cure was too slow.

The cure-rate factor ($t_{35}-t_5$) of stock 2 illustrates the enhanced effectiveness of an accelerator combination of this invention containing the element the tert-butylamine salt of O,O-di-n-butyl phosphorodithioic acid over stocks 1 and 3. Results comparable to those in Table III are obtained with accelerator combinations which include the other amine salts of this invention.

Analogous results to those in Tables I, II, and III, supra, are obtained in EPDM vulcanization when the parts by weight ratio of phosphorodithioate to 20 parts thiuram or 20 parts salts of dithiocarbamic acid is varied as much as 0.5 to 60. The preferred range is 20 to 40. Optimum properties are achieved with thiuram or salts of dithiocarbamic acid as the majority proportion. Accelerating effect is observed over a wide range of total acceleration, for example, 0.5 to 10 parts per hundred parts of EPDM, but at least 1.0 part per hundred parts of EPDM is preferred. The invention is useful for accelerating non-black stocks containing clay. The tellurium salts of this invention increase the EPDM stock's resistance to reversion.

It is intended to cover all changes and modifications of the examples of the invention herein chosen for purposes of disclosure which do not constitute departures from the spirit and scope of the invention.

What is claimed is:

1. A method of vulcanizing sulfur-vulcanizable EPDM rubber which comprises:
  mixing the EPDM rubber with a sulfur-containing vulcanizing agent and an accelerating amount of a vulcanization accelerator combination consisting of
  a salt of a phosphorodithioic acid of the formulas

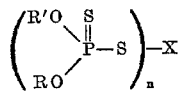

or

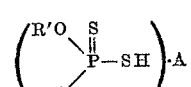

wherein R and R' are alkyl, aryl, alicyclic, alkenyl, aralkyl, or alkaryl of less than 19 carbon atoms; X is zinc, iron, cadmium, tin, or copper and n is 2; X is iron and n is 3; or X is tellurium or tin and n is 4; and A is a primary, secondary, or tertiary amine and r is 1 or 2; and
  a thiuram of the formula

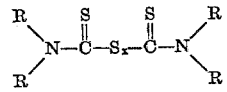

wherein the R's are alkyl or alicyclic containing 1 to 9 carbon atoms; the R's on the same nitrogen form a ring with the nitrogen containing 4 to 9 carbon atoms; or the R's on the same nitrogen form a ring with the nitrogen of morpholine or 2,6-dimethylmorpholine; and x is a number from 1 to 4; or
  a salt of dithiocarbamic acid; and
  heating the mixture at a vulcanizing temperature.

2. A vulcanized EPDM rubber product obtained by the method of claim 1.

3. A method of vulcanizing sulfur-vulcanizable EPDM rubber according to claim 1 wherein the salt of phosphorodithioic acid is of the formula

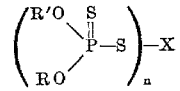

wherein R and R' are alkyl, aryl, alicyclic, alkenyl, aralkyl or alkaryl of less than 19 carbon atoms; and X is zinc, iron, cadmium, tin, or copper and n is 2; X is iron and n is 3; or X is tellurium or tin and n is 4.

4. A method of vulcanizing sulfur-vulcanizable EPDM rubber according to claim 3 wherein the accelerator combination consists of S-zinc O,O-di-n-butyl phosphorodithioate and tetramethylthiuram disulfide.

5. A method of vulcanizing sulfur-vulcanizable EPDM rubber according to claim 3 wherein the accelerator combination consists of S-zinc O,O-di-n-butyl phosphorodithioate and zinc dimethyl dithiocarbamate.

6. A method of vulcanizing sulfur-vulcanizable EPDM rubber according to claim 3 wherein the accelerator combination consists of S-tellurium O,O-di-n-butyl phosphorodithioate and tetramethylthiuram monosulfide.

7. A method of vulcanizing sulfur-vulcanizable EPDM rubber according to claim 1 wherein the salt of phosphorodithioic acid is of the formula

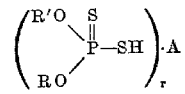

wherein R and R' are alkyl, aryl, alicyclic, alkenyl, aralkyl, or alkaryl of less than 19 carbon atoms; and A is diethylamine, cyclohexylamine, tert-butylamine, monoethanolamine, diethanolamine, triethanolamine, diisopropanolamine, triisopropanolamine, morpholine, piperidine, or 3-azabicyclo[3.2.2]nonane, and r is 1; or A is piperazine and r is 2.

8. A method of vulcanizing sulfur-vulcanizable EPDM rubber according to claim 7 wherein the accelerator combination consists of the tert-butylamine salt of O,O-di-n-butyl phosphorodithioic acid and tetramethylthiuram monosulfide.

9. A vulcanization accelerator combination which consists of
  a salt of a phosphorodithioic acid of the formula

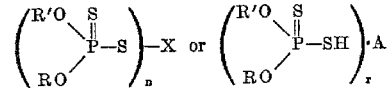

wherein R and R' are alkyl, aryl, alicyclic, alkenyl, aralkyl, or alkaryl of less than 19 carbon atoms; X is zinc, iron, cadmium, tin, or copper and n is 2; X is iron and n is 3; or X is tellurium or tin and n is 4; and A is diethylamine, cyclohexylamine, tert-butylamine, monoethanolamine, diethanolamine, triethanolamine, diisopropanolamine, triisopropanolamine, morpholine, piperidine, or 3-azabicyclo[3.2.2]nonane, and r is 1 or A is piperazine and r is 2; and
  a thiuram of the formula

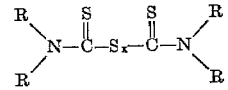

wherein the R's are alkyl or alicyclic containing 1 to 9 carbon atoms; the R's on the same nitrogen form a ring with the nitrogen containing 4 to 9 carbon atoms; or the R's on the same nitrogen form a ring with the nitrogen of morpholine or 2,6-dimethylmorpholine; and $x$ is a number from 1 to 4; or a salt of a dithiocarbamic acid.

10. A vulcanization accelerator combination according to claim 9 consisting of S-zinc O,O-di-n-butyl phosphorodithioate and tetramethylthiuram disulfide.

11. A vulcanization accelerator combination according to claim 9 consisting of S-zinc O,O-di-n-butyl phosphorodithioate and zinc dimethyl dithiocarbamate.

12. A vulcanization accelerator combination according to claim 9 consisting of S-tellurium O,O-di-n-butyl phosphorodithioate and tetramethylthiuram monosulfide.

13. A vulcanization accelerator combination according to claim 9 consisting of the tert-butylamine salt of O,O-di-n-butyl phosphorodithioic acid and tetramethylthiuram monosulfide.

References Cited

UNITED STATES PATENTS

| 2,063,629 | 12/1936 | Salzberg et al. | 260—924 |
| 2,879,243 | 3/1959 | Anderson | 260—29.7 |
| 3,400,106 | 9/1968 | Morita et al | 260—79.5 |

FOREIGN PATENTS

| 1,452,993 | 9/1966 | France. |

OTHER REFERENCES

Chem. Abst., 66, 66486 g.

JOSEPH L. SCHOFER, Primary Examiner

C. A. HENDERSON, Jr., Assistant Examiner

U.S. Cl. X.R.

260—239, 429, 439, 429.7, 438.1, 247, 268, 925 793, 791, 792, 784, 23.7